United States Patent
Chou

(10) Patent No.: US 9,267,540 B2
(45) Date of Patent: Feb. 23, 2016

(54) LINEAR GUIDEWAY AND TRACK MODULE THEREOF

(71) Applicant: OME TECHNOLOGY CO., LTD., New Taipei (TW)

(72) Inventor: Yao-Hsin Chou, Taipei (TW)

(73) Assignee: OME Technology Co., Ltd., New Taipei (TW)

( * ) Notice: Subject to any disclaimer, the term of this patent is extended or adjusted under 35 U.S.C. 154(b) by 0 days.

(21) Appl. No.: 14/308,900

(22) Filed: Jun. 19, 2014

(65) Prior Publication Data

US 2015/0308497 A1    Oct. 29, 2015

(30) Foreign Application Priority Data

Apr. 25, 2014   (TW) .............................. 103207253 U

(51) Int. Cl.
*F16C 29/04* (2006.01)
*F16C 29/00* (2006.01)

(52) U.S. Cl.
CPC ............... *F16C 29/04* (2013.01); *F16C 29/005* (2013.01)

(58) Field of Classification Search
CPC ..... F16C 19/362; F16C 29/041; F16C 29/043
See application file for complete search history.

(56) References Cited

U.S. PATENT DOCUMENTS

| 1,235,116 | A | * | 7/1917 | Coppage | 384/571 |
| 2,721,776 | A | * | 10/1955 | Ruist | 384/578 |
| 4,215,904 | A | * | 8/1980 | Teramachi | 384/47 |
| 2001/0048776 | A1 | * | 12/2001 | Kawaguchi et al. | 384/51 |

FOREIGN PATENT DOCUMENTS

CH           303754        *  2/1955

* cited by examiner

*Primary Examiner* — Thomas R. Hannon
(74) *Attorney, Agent, or Firm* — Rosenberg, Klein & Lee

(57) ABSTRACT

A linear guide includes an elongated spacer, a plurality of rollers, and two sliding blocks. The spacer has a plurality of thru-holes arranged in a row along a longitudinal direction thereof. The spacer has two engaging portions respectively arranged at two opposite sides of the row of thru-holes. The rollers are respectively arranged in the thru-holes. Each sliding block has a rolling groove and an engaging groove formed on a bottom portion of the rolling groove, and each rolling groove has two track surfaces spaced apart from each other. The engaging portions are respectively inserted into the engaging grooves such that each sliding block slides with respect to another sliding block only. The track surfaces of each sliding block are respectively arranged at two opposite sides of the spacer, and the rollers are rollably clamped between the track surfaces of the sliding blocks.

8 Claims, 13 Drawing Sheets

LINEAR GUIDEWAY AND TRACK MODULE THEREOF

BACKGROUND OF THE DISCLOSURE

1. Field of the Disclosure

The instant disclosure relates to a linear transmission device; more particular, to a linear guideway and a track module thereof.

2. Description of Related Art

The conventional linear guideway has an elongated spacer, a plurality of rollers positioned on the spacer, and two sliding blocks respectively arranged at two opposite sides of the spacer, and the rollers. The rollers are positioned by the spacer, such that the construction of the conventional linear guideway is complex and needs higher accuracy, thereby affecting the manufacturing and assembly of the conventional linear guideway.

To achieve the abovementioned improvement, the inventors strive through industrial experience and academic research to present the instant disclosure, which can provide additional improvement as mentioned above.

SUMMARY OF THE DISCLOSURE

One embodiment of the instant disclosure provides a linear guideway and a track module thereof for simplifying the spacer.

The linear guideway provided by the instant disclosure comprises: an elongated spacer defining a longitudinal direction, wherein the spacer has a receiving portion and two engaging portions, the receiving portion has a plurality of thru-holes arranged in a row along the longitudinal direction and spaced apart from each other, the engaging portions are respectively arranged on two opposite edges of the receiving portion; a plurality of rollers respectively arranged in the thru-holes of the spacer; and two elongated sliding blocks, wherein each sliding block has a rolling groove and an engaging groove concavely formed on a bottom portion of the rolling groove, each rolling groove has two track surfaces spaced apart from each other, and each engaging groove is in air communication with the corresponding rolling groove, wherein the engaging portions of the spacer are respectively and slidably inserted into the engaging grooves of the sliding blocks along the longitudinal direction, thereby sustaining sliding of each sliding block only along the longitudinal direction with respect to another sliding block, wherein the track surfaces of each sliding block are respectively arranged at two opposite sides of the receiving portion of the spacer, each roller is respectively arranged in the rolling grooves of the sliding blocks, and the rollers are rollably clamped between the track surfaces of the sliding blocks by respectively inserting the engaging portions into the engaging grooves.

The track module provided by the instant disclosure comprises: an elongated spacer defining a longitudinal direction, wherein the spacer has a receiving portion and two engaging portions, the receiving portion has a plurality of thru-holes arranged in a row along the longitudinal direction and spaced apart from each other, the engaging portions are respectively arranged on two opposite edges of the receiving portion; and two sliding blocks, wherein each sliding block has a rolling groove and an engaging groove concavely formed on a bottom portion of the rolling groove, each rolling groove has two track surfaces spaced apart from each other, and each engaging groove is in air communication with the corresponding rolling groove, wherein the engaging portions of the spacer are respectively and slidably inserted into the engaging grooves of the sliding blocks along the longitudinal direction, thereby sustaining sliding of each sliding block only along the longitudinal direction with respect to another sliding block; wherein the track surfaces of each sliding block are respectively arranged at two opposite sides of the receiving portion of the spacer.

Base on the above, the sliding blocks clamp the rollers by engaging with the spacer for causing the rollers to stably roll in the track module. Moreover, the spacer of the instant disclosure does not need to fix the rollers, so that the construction of the spacer is more simply than the conventional spacer, and accuracy of the spacer is lower than conventional spacer, thereby simplifying the manufacturing and assembly of the linear guideway (or the track module).

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

First Embodiment

Figure 1:
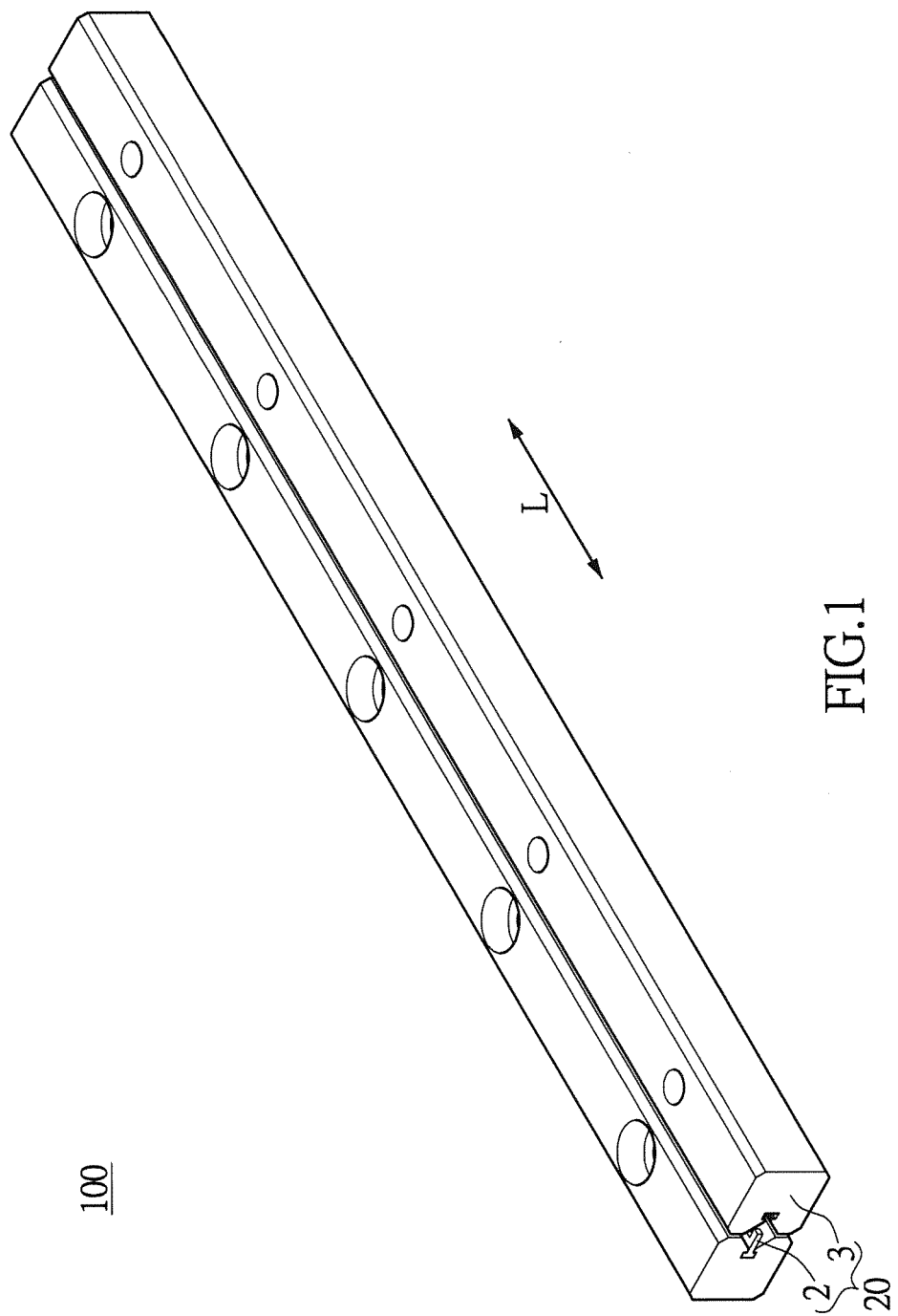
FIG. 1 is a perspective view showing a first embodiment of a linear guideway according to the instant disclosure.

Please refer to FIGS. 1 through 7, which show a first embodiment of the instant disclosure. The instant embodiment provides a linear guideway 100 having a plurality of rollers 1 and a track module 20. The outer surface of the roller 1 defines a rolling surface 11 and two end surfaces 12 arranged at two opposite sides of the rolling surface 11. The roller 1 in the instant embodiment takes a column roller for example, but is not limited thereto. For example, the roller 1 not shown in the instant embodiment can be a ball roller. The track module 20 is configured to receiving the rollers 1, and the rollers 1 in the instant embodiment are spaced apart from each other and arranged in a staggering configuration.

Figure 2:
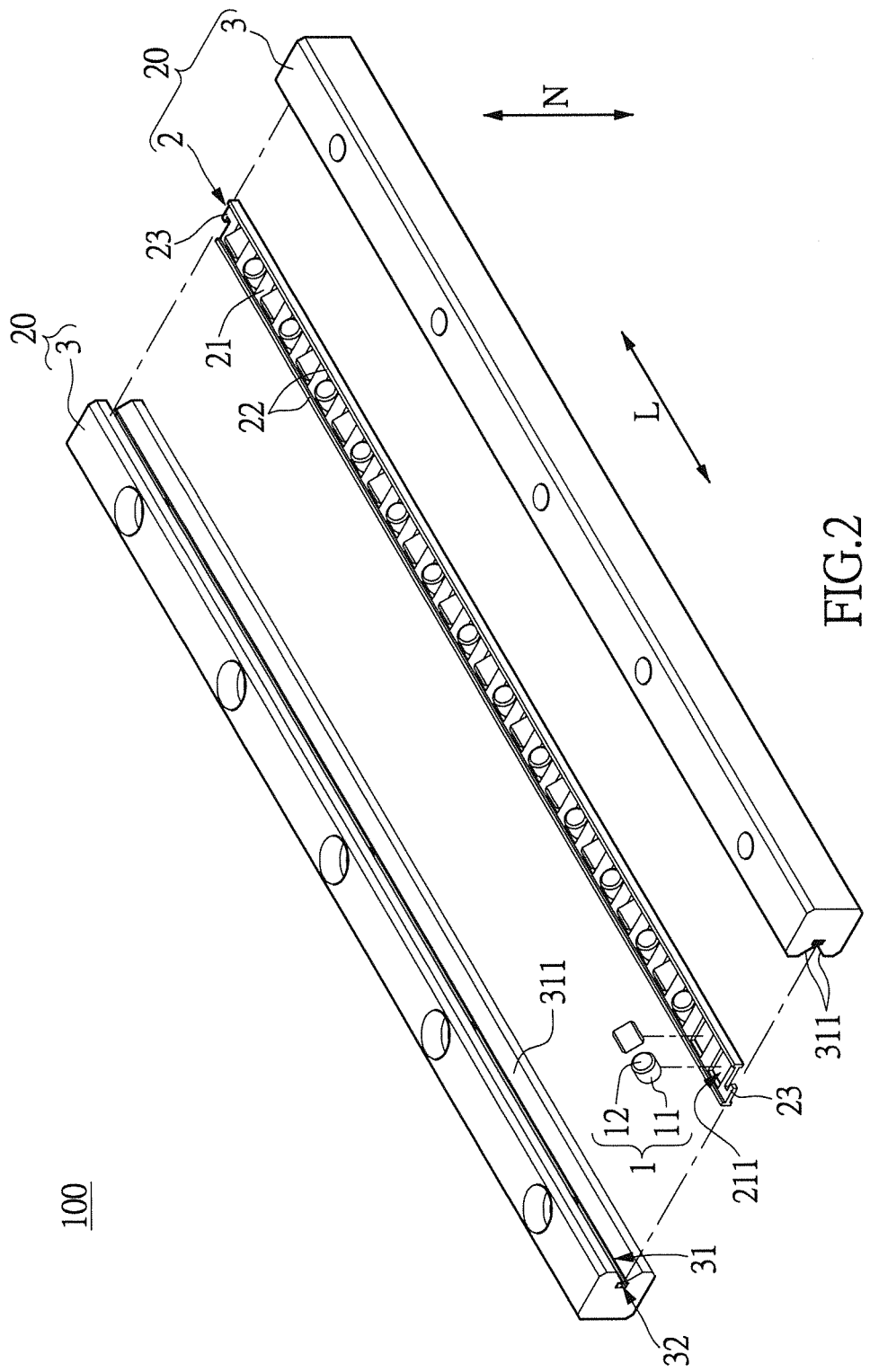
FIG. 2 is an exploded view of FIG. 1.
Figure 3:
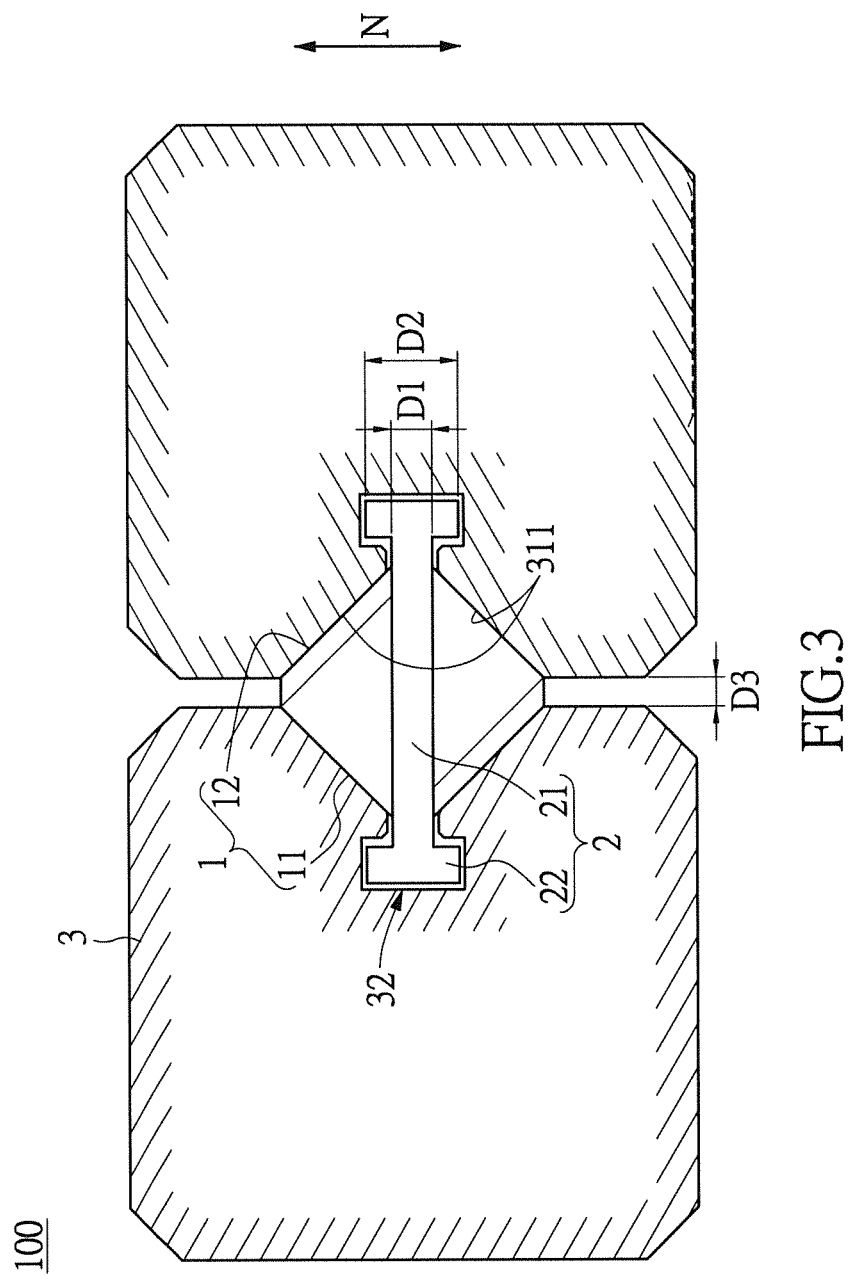
FIG. 3 is a cross-sectional view of FIG. 1.
Figure 4:
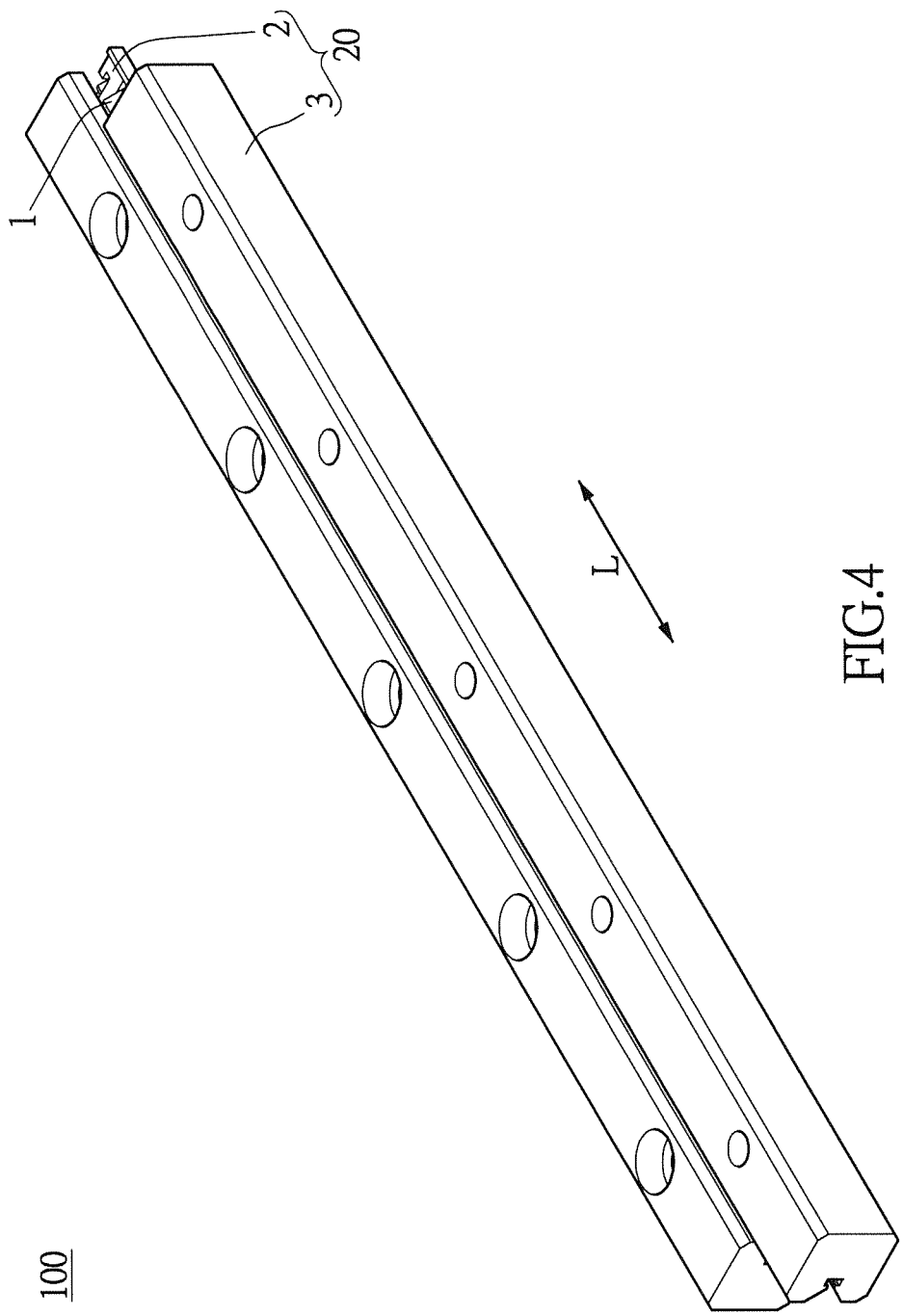
FIG. 4 is a schematic view showing the moving state of the linear guideway of FIG. 1.

Please refer to FIGS. 2 through 4. The track module 20 has an elongated spacer 2 and two elongated sliding blocks 3 respectively sleeved at two opposite edges of the spacer 2.

The sliding blocks 3 are slidably installed on the longitudinal edges of spacer 2 (i.e., the left-upper edge and the right-lower edge of the spacer 2 as shown in FIG. 2). The following description discloses the construction of the spacer 2 and the construction of the sliding blocks 3 firstly, and then discloses the relationship of the spacer 2 and the sliding blocks 3.

The spacer 2 defines a longitudinal direction L. The spacer 2 has an elongated receiving portion 21 arranged at a center thereof and two engaging portions 22 arranged on two opposite edges of the receiving portion 21 (i.e., the left-upper edge and the right-lower edge of the receiving portion 21 as shown in FIG. 2).

The receiving portion 21 is sheet-like and defines a normal direction N perpendicular to the main surface of the receiving portion 21. The receiving portion 21 has a thickness D1 along the normal direction N, each engaging portion 22 has a height D2 along the normal direction N, and the height D2 of each engaging portion 21 is greater than the thickness D1 of the receiving portion 21 (as shown in FIG. 3).

Specifically, the spacer 2 is integrally formed in one piece, and the engaging portions 22 are respectively and perpendicularly extended from two opposite longitudinal edges of the receiving portion 21. The receiving portion 21 has two connecting portions 23 respectively arranged on two opposite short edges thereof, and each connecting portion 23 conforms to another connecting portion 23 in geometric shape. That is to say, when one spacer 2 is not long enough, the user can connect several spacers 2 one by one via the connecting portion 23 along the longitudinal direction L thereof.

Moreover, the receiving portion 21 has a plurality of rectangular thru-holes 211 arranged in a row along the longitudinal direction L and spaced apart from each other. The engaging portions 22 are respectively arranged at two opposite sides of the row of the thru-holes 211. In the instant embodiment, a portion of the spacer 2 without any thru-hole 211 has a cross-section perpendicular to the longitudinal direction L, and the cross-section is H-shaped (as shown in FIG. 3).

The rollers 1 are respectively arranged in the thru-holes 211 of the spacer 2. In more detail, any two adjacent rollers 1 each has a center axis with respect to the receiving portion 21 in 45 degrees, and the center axes of the adjacent rollers 1 are perpendicular to each other, but the arrangement of the rollers 1 is not limited thereto. Specifically, about each roller 1, the distance between each point of the rolling surface 11 and the corresponding center axis is identical.

The spacer 2 is configured to limit the rollers 1 from moving along the longitudinal direction L with respect to the spacer 2. Specifically, if the spacer 2 and the rollers 1 are flatly placed and downwardly inserted into the thru-holes 211 of the spacer 2, the spacer 3 is preferably configured to carry the rollers 1 and avoid the rollers 1 from falling down, but the rollers 1 can be moved away from the spacer 2 along the inserting path thereof.

That is to say, the spacer 2 is only used for carrying the rollers 1, and each roller 1 is still movable with respect to the respective thru-hole 211 of the spacer 2 (i.e., each roller 1 can move along the inserting path thereof). Thus, the spacer 2 does not need to fix the rollers 1, so that the construction of the spacer 2 is more simple than the conventional spacer, and accuracy of the spacer 2 is lower than conventional spacer, thereby simplifying the manufacturing and assembly of the linear guideway 100.

Besides, the spacer 2 can be designed to only limit the rollers 1 to move along the longitudinal direction L with respect to the spacer 2. That is to say, when the rollers 1 are downwardly inserting into the thru-holes 211 of the spacer 2, the rollers 1 are passing through the thru-holes 211. Thus, the movable direction of the rollers 1 needs to be limited by the other components (i.e., the sliding blocks 3). Specifically, the sliding blocks 3 clamp the rollers 1 to avoid the rollers 1 from moving with respect to the spacer 2.

The sliding blocks 3 have identical constructions, so the following description just discloses the construction of one of the sliding blocks 3. The length of sliding block 3 is approximately identical to the length of the spacer 2. The sliding block 3 has an elongated rolling groove 31 concavely formed on the center of a long lateral surface thereof, and the sliding block 3 has an elongated engaging groove 32 concavely formed on a bottom portion of the rolling groove 31.

The longitudinal direction of the sliding block 3, the longitudinal direction of the rolling groove 31, and the longitudinal direction of the engaging groove 32 are parallel to each other. Each rolling groove 31 has two elongated track surfaces 311 spaced apart from each other. Each track surface 311 is flat surface, and the normal directions of the track surfaces 311 of each rolling groove 31 are perpendicular to each other. The engaging groove 32 is configured to provide the engaging portion 22 to slide therein, that is to say, when the engaging portion 22 is inserted into the corresponding engaging groove 32, the engaging portion 22 is only movable along the corresponding engaging groove 32, and the engaging portion 22 cannot move in another direction.

The engaging portions 22 of the spacer 2 are respectively and slidably coupling through the engaging grooves 32 of the sliding blocks 3 along the longitudinal direction L, thereby sustaining sliding of each sliding block 3 only along the longitudinal direction L with respect to another sliding block 3. In other words, the movement of each sliding block 3 is parallel to the movement of another by the sliding blocks 3 engaging with the spacer 2. Moreover, the track surfaces 311 of each sliding block 3 are respectively arranged at two opposite sides of the receiving portion 21 of the spacer 2 (i.e., the upper side and the lower side of the receiving portion 21 as shown in FIG. 3). The track surface 311 of one sliding block 3 arranged at one side (e.g, the upper side) of the spacer 2 and the track surface 311 of another sliding block 3 arranged at another side (e.g, the lower side) of the spacer 2 are parallel to each other.

It should be noted that the distance D3 between the sliding blocks 3 can be designed equal to or smaller than the thickness D1 of the receiving portion 21 of the spacer 2, thereby reducing the volume occupied by the track module 20. The distance D3 between the sliding blocks 3 in the instant embodiment is smaller than the thickness D1 of the receiving portion 21 of the spacer 2.

Moreover, two opposite portions of each roller 1 are respectively arranged in the rolling grooves 31 of the sliding blocks 3, and the rollers 3 are rollably clamped between the track surfaces 311 of the sliding blocks 3 by the engaging portions 22 respectively inserted into the engaging grooves 32. Specifically, the movement of each sliding block 3 is parallel to the movement of another by the sliding blocks 3 engaging with the spacer 2, and the parallel track surfaces 311 clamps the rollers 3 in order to limit the rollers 3 to move with respect to the spacer 2. Thus, the rollers 3 can stably roll in the track module 20.

Figure 5:
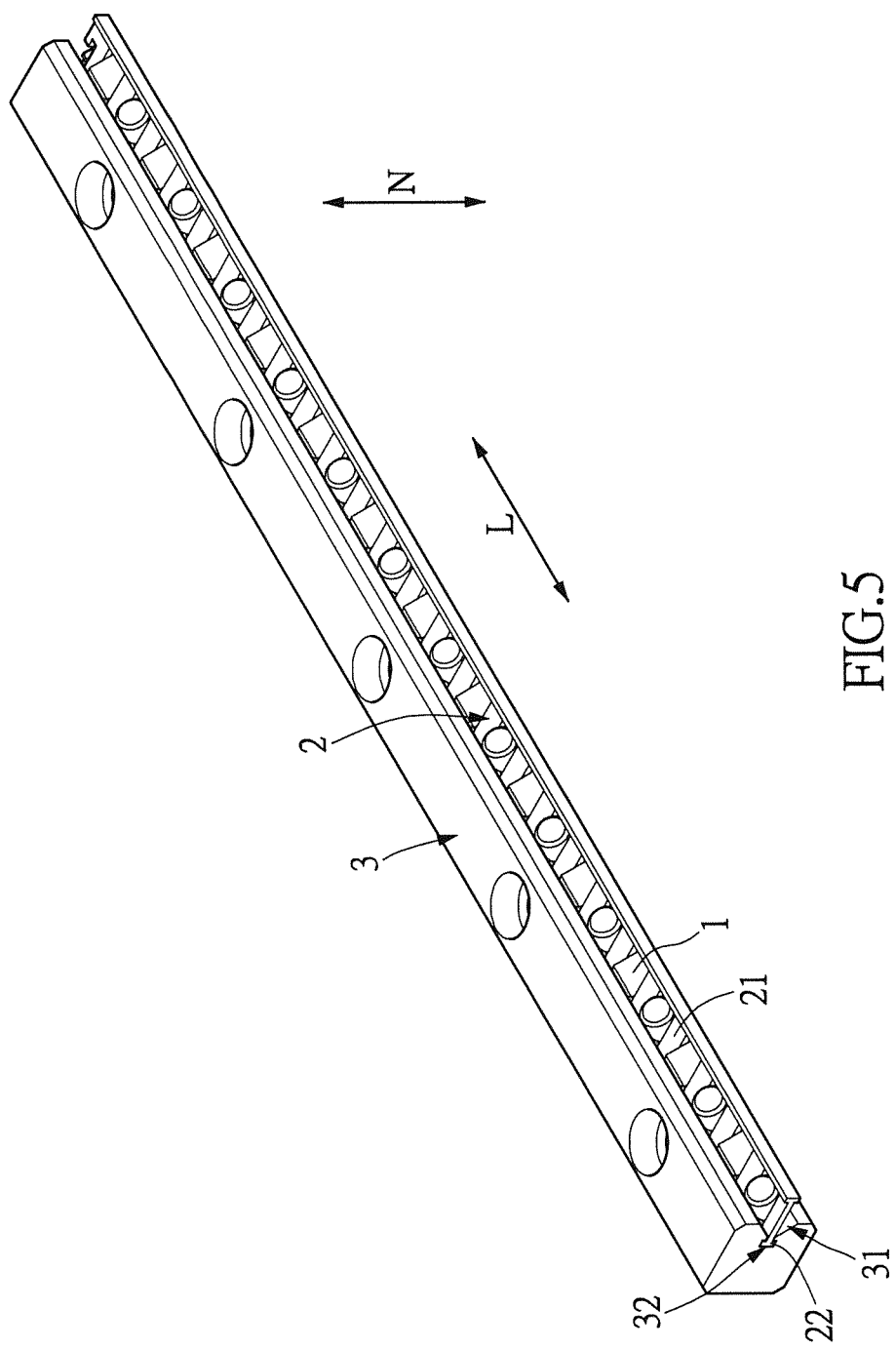
FIG. 5 is a perspective view showing the linear guideway without one sliding block according to the first embodiment the instant disclosure.
Figure 6:
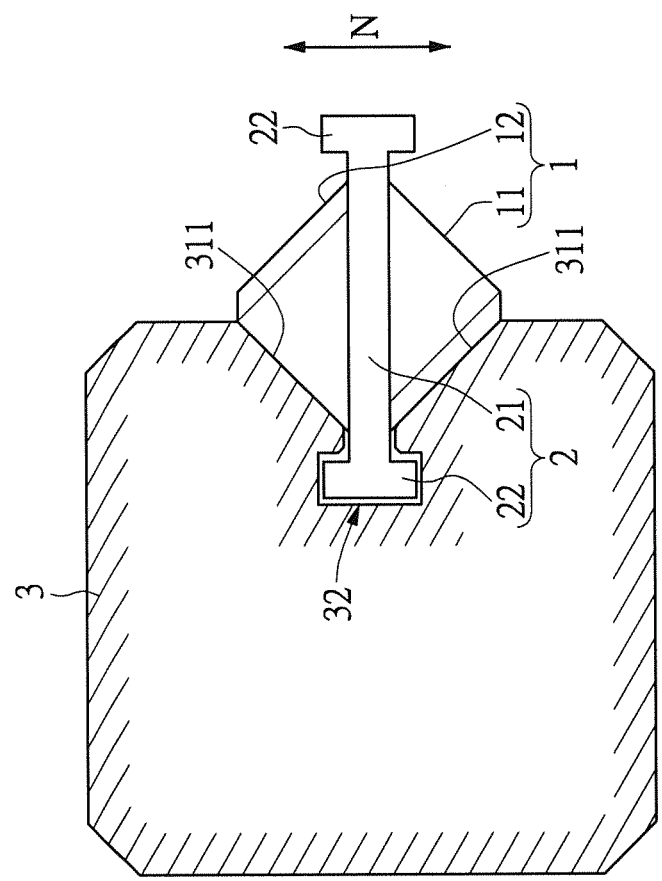
FIG. 6 is a cross-sectional view of FIG. 5.

Additionally, as shown in FIGS. 5 and 6, after one of the engaging portions 22 inserted into the corresponding engaging groove 32, another engaging portion 22 of the spacer 2 can be used for limiting the movement of the rollers 1. Thus, when one of the engaging portions 22 inserted into the corresponding engaging groove 32, the rollers 1 received in the spacer 2 cannot move with respect to the spacer 2 by another engaging portion 22, thereby positioning the rollers 1 and avoiding the rollers 1 to fall down.

Figure 7:
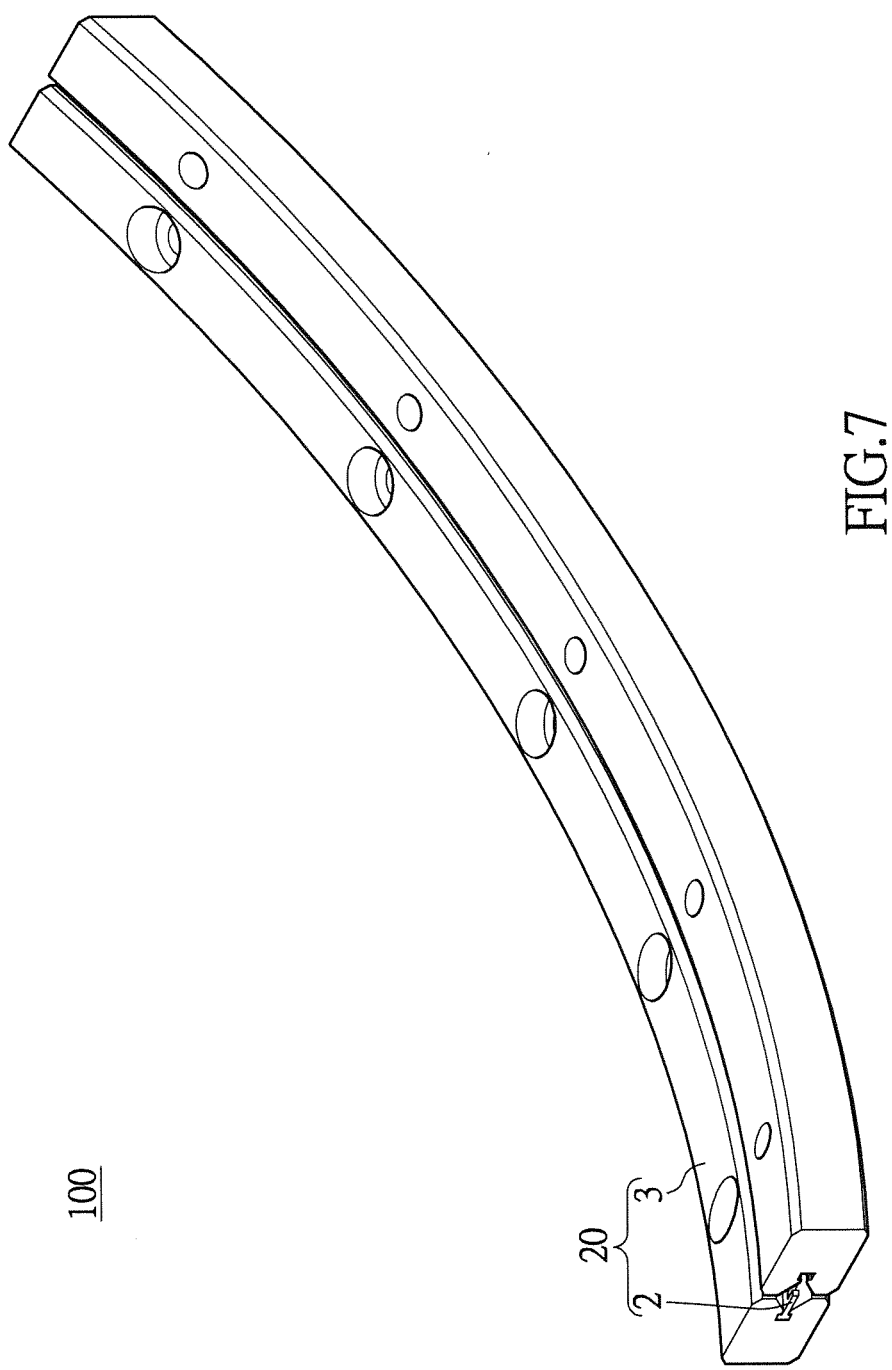
FIG. 7 is a perspective view showing the linear guideway in curvy type according to the first embodiment the instant disclosure.

Besides, the spacer 2 and the sliding blocks 3 are straight for example, but are not limited thereto. For example, the spacer 2 and the sliding blocks 3 may be curvy (as shown in FIG. 7) or circular (not shown).

Second Embodiment

Figure 8:
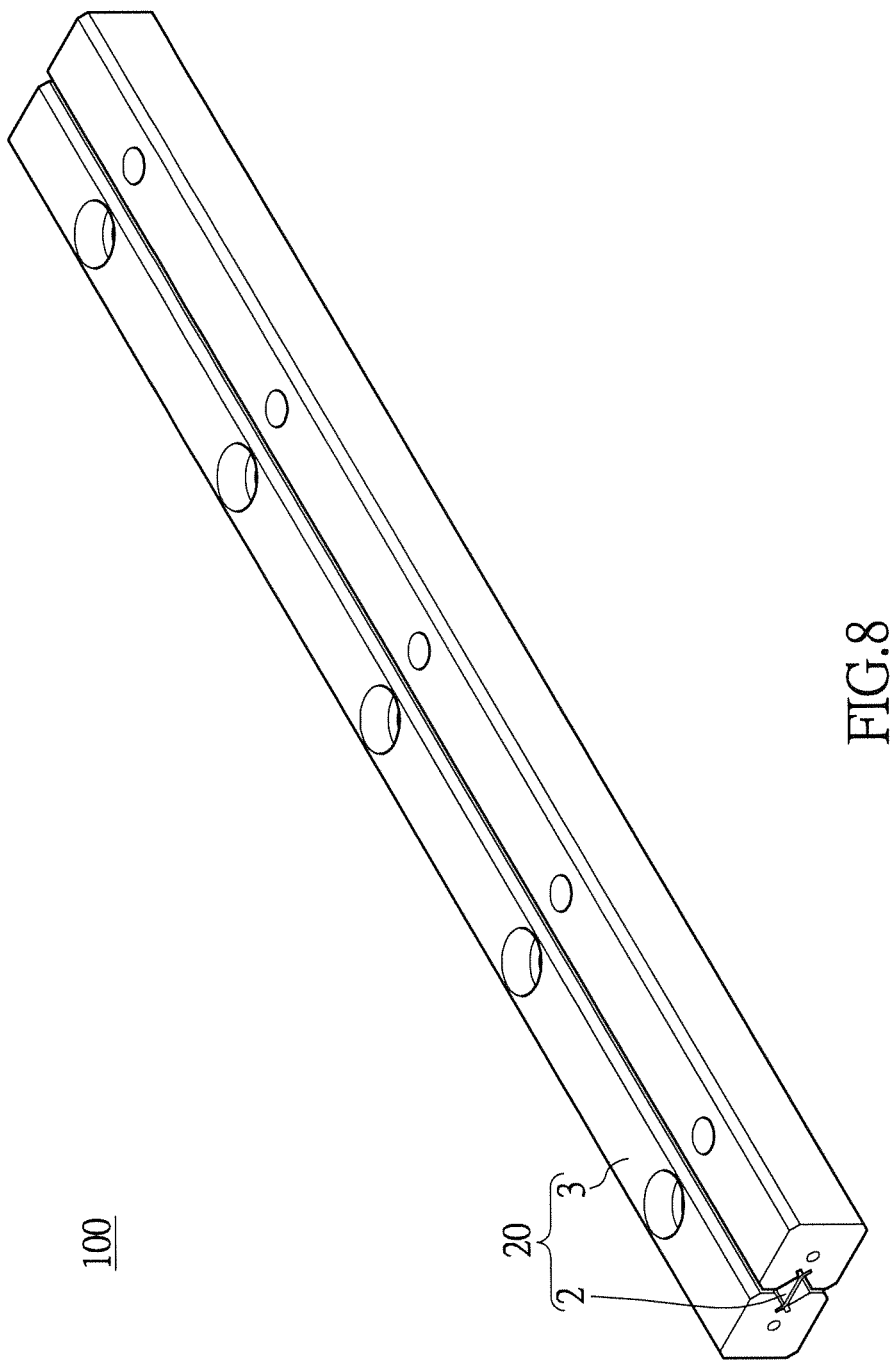
FIG. 8 is a perspective view showing a second embodiment of the linear guideway according to the instant disclosure.
Figure 9:
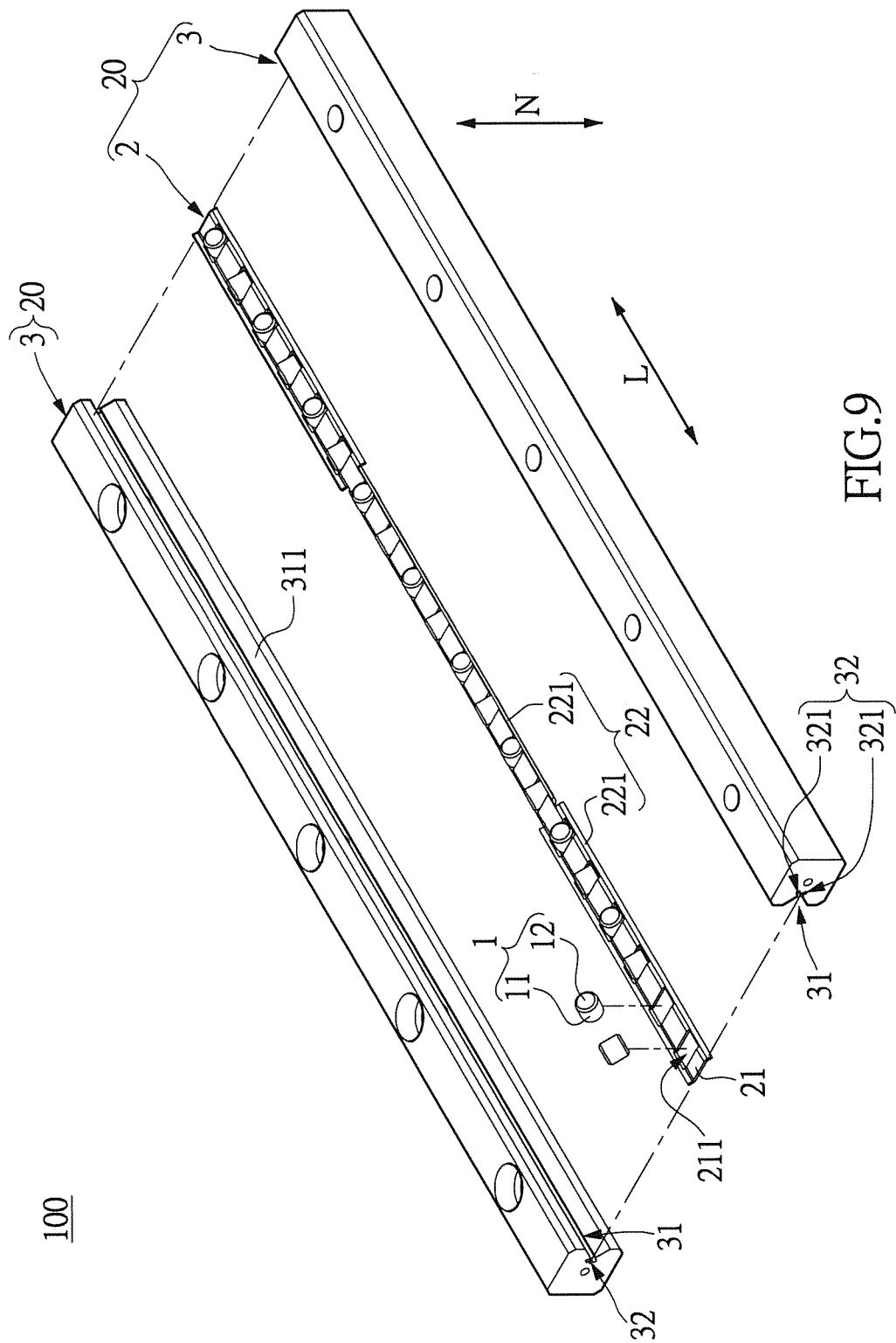
FIG. 9 is an exploded view of FIG. 8.
Figure 10:
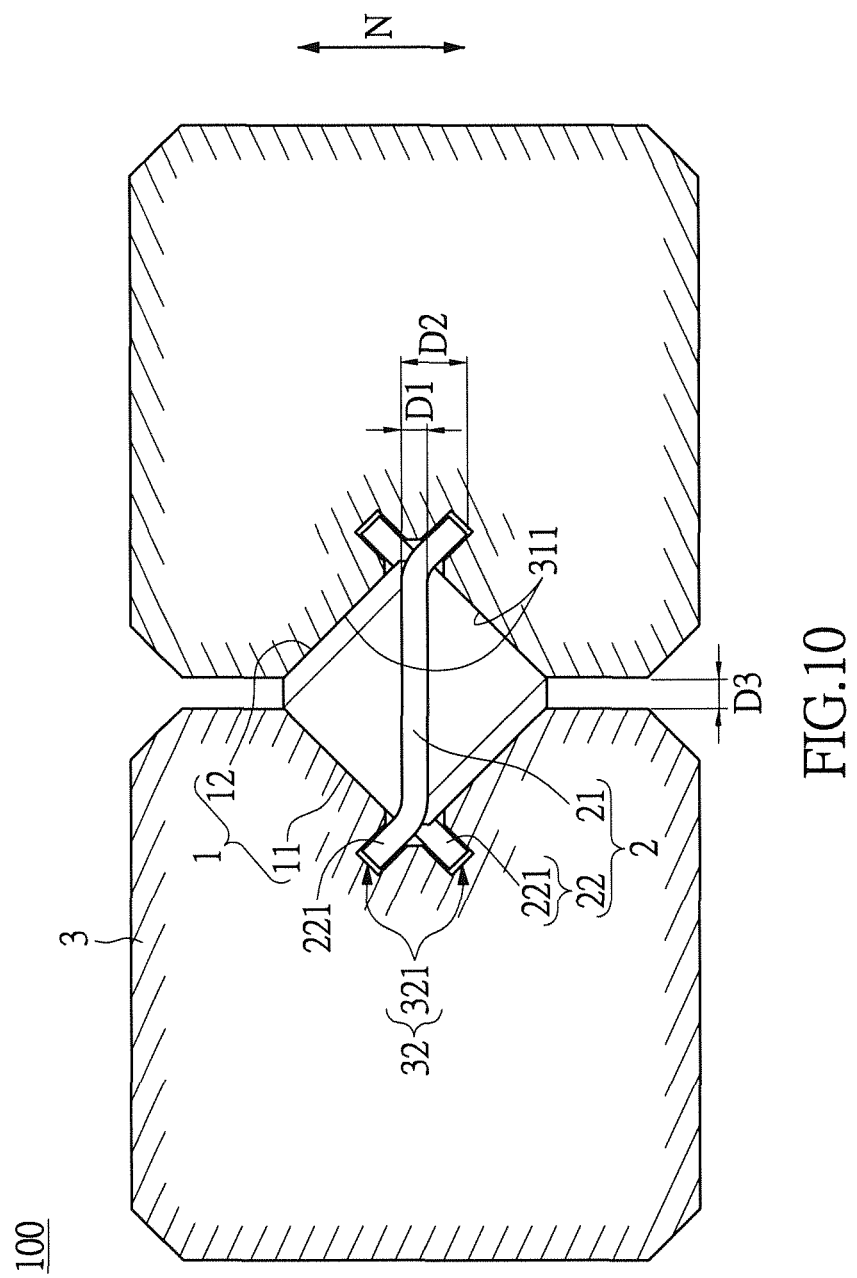
FIG. 10 is a cross-sectional view of FIG. 8.

Please refer to FIGS. 8 through 10, which show a second embodiment of the instant disclosure. The instant embodiment is similar to the first embodiment, so that the identical features of the two embodiments do not state again. The difference between the embodiments is the engaging portion 22 and the corresponding engaging groove 32.

Specifically, the spacer 2 of the instant embodiment is also integrally formed in one piece. Each engaging portion 22 has a plurality of sheets 221, and any two adjacent sheets 221 of each engaging portion 22 are respectively extended from the corresponding longitudinal edge of the receiving portion 21 in two different directions. In this embodiment, the two adjacent sheets 221 of each engaging portion 22 are perpendicular to each other and are arranged 135 degrees with respect to the receiving portion 21. Moreover, the sheets 221 of one engaging portion 22 are respectively corresponding to the sheets 221 of another engaging portion 22, and any two corresponding sheets 221 are respectively extended from corresponding longitudinal edges of the receiving portion 21 in two different directions.

The engaging groove 32 of each sliding block 3 has two sub-grooves 321, and the sub-grooves 321 of each sliding block 3 are configured to receive the sheets 221 of one engaging portion 22. That is to say, the sub-grooves 321 of each sliding block 3 are respectively configured to receive the two adjacent sheets 221 of one engaging portion 22, thereby causing the adjacent sheets 221 received in the corresponding sub-grooves 321 to only move along the longitudinal direction L. Thus, the sheets 221 of the engaging portions 22 are slidably inserted into the sub-grooves 321 of the engaging grooves 32 along the longitudinal direction L, thereby sustaining sliding of each sliding block 3 with respect to another sliding block 3 to only along the longitudinal direction L.

Additionally, the distance D3 between the sliding blocks 3 in the instant embodiment is substantially equal to the thickness D1 of the receiving portion 21 of the spacer 2, thereby reducing the volume occupied by the track module 20.

Figure 11:
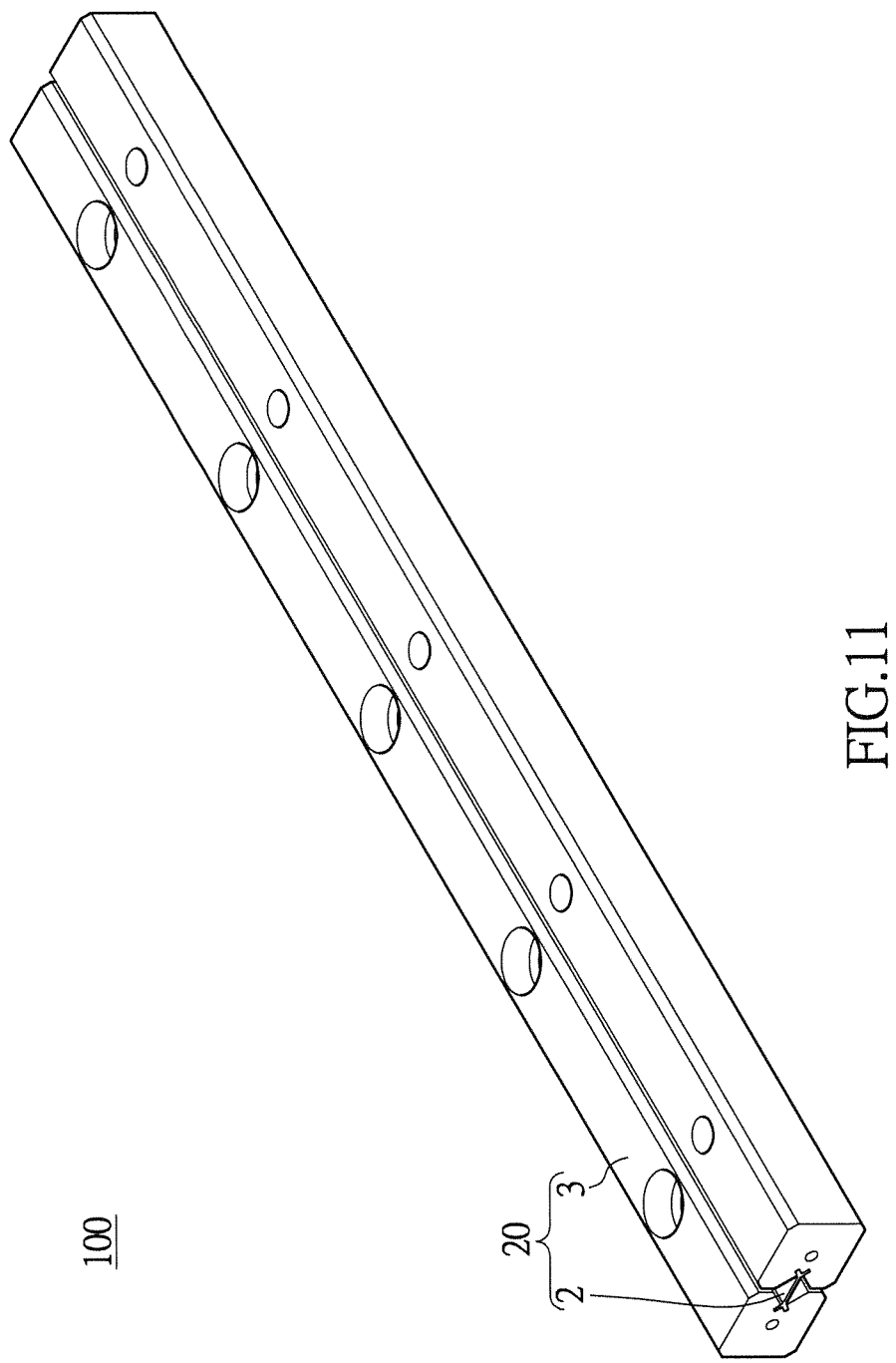
FIG. 11 is a perspective view showing the linear guideway in another type according to the instant disclosure.
Figure 12:
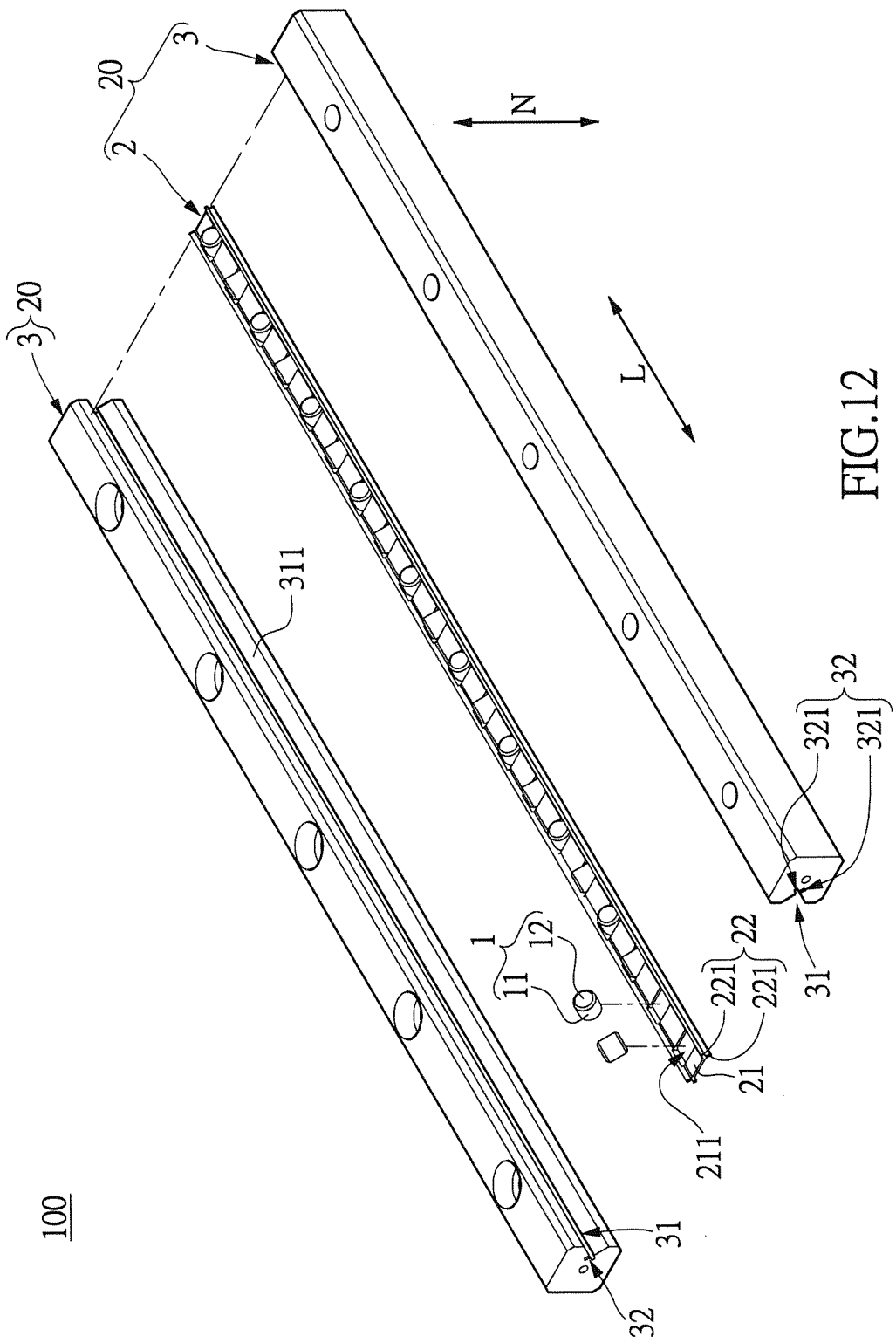
FIG. 12 is an exploded view of FIG. 11.
Figure 13:
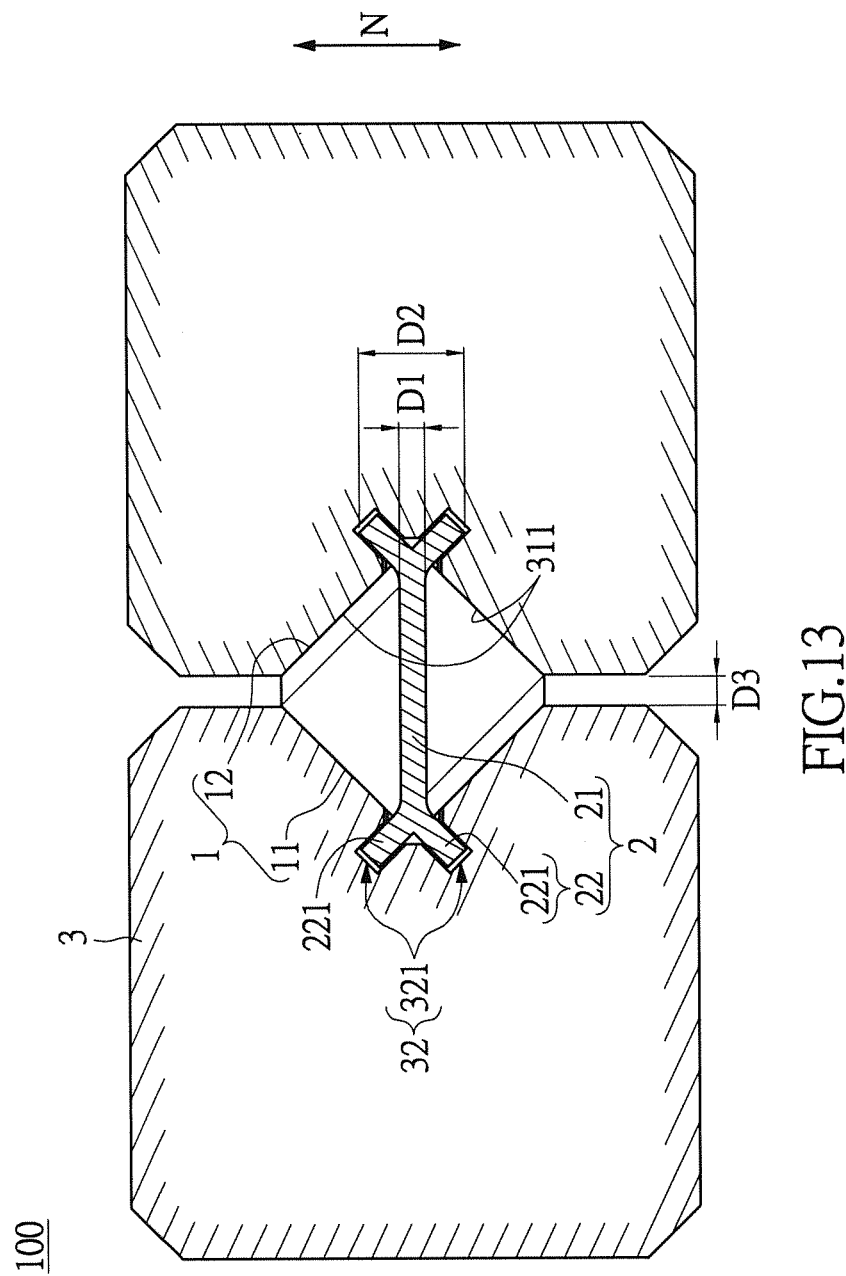
FIG. 13 is a cross-sectional view of FIG. 11.

Besides, the instant embodiment also provides a spacer 2 in different type as shown in FIGS. 11 through 13. Each engaging portion 22 has two elongated sheets 221 spaced apart from each other, and the length of each sheet 221 is substantially identical to the length of receiving portion 21. The sheets 221 of each engaging portion 22 are extended from the corresponding longitudinal edge of the receiving portion 21 in different directions. For example, the sheets 221 of the left engaging portion 22 as shown in FIG. 13 are extended from the left longitudinal edge of the receiving portion 21 respectively in right-upper direction and right-lower direction. Moreover, the sheets 221 of each engaging portion 22 are perpendicular to each other and are arranged 135 degrees with respect to the receiving portion 21. A portion of the spacer 2 without any thru-hole 211 has a cross-section perpendicular to the longitudinal direction L, and the cross-section is Y-shaped The Probable Effect of the Above Embodiments Base on the above disclosure, the moving of each sliding block is parallel to the moving of another sliding block by engaging with the spacer, and the parallel track surfaces clamps the rollers for limiting the rollers to move with respect to the spacer. Thus, the rollers can stably roll in the track module.

Moreover, the spacer of the instant disclosure does not need to fix the rollers, so that the construction of the spacer is simple compared to the conventional spacer, and accuracy of the spacer is lower than conventional spacer, thereby simplifying the manufacturing and assembly of the linear guideway.

In addition, the distance between the sliding blocks in the instant disclosure is substantially equal to or smaller than the thickness of the receiving portion of the spacer, thereby reducing the volume occupied by the track module.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. A linear guideway, comprising:
an elongated spacer defining a longitudinal direction, wherein the spacer has a receiving portion and two engaging portions, the receiving portion has a plurality of thru-holes arranged in a row along the longitudinal direction and spaced apart from each other, the engaging portions are respectively arranged on two opposite edges of the receiving portion,
wherein the spacer is integrally formed in one piece, the engaging portions are respectively extended from two opposite longitudinal edges of the receiving portion; the receiving portion resembles a sheet and defines a normal direction perpendicular to a main surface of the receiving portion, the receiving portion has a thickness along the normal direction, each engaging portion has a height along the normal direction, and the height of each engaging portion is greater than the thickness of the receiving portion;
a plurality of rollers respectively arranged in the thru-holes of the spacer; and
two elongated sliding blocks, wherein each sliding block has a rolling groove and an engaging groove concavely formed on a bottom portion of the rolling groove, each rolling groove has two track surfaces spaced apart from each other, and each engaging groove is in air communication with the corresponding rolling groove,
wherein the engaging portions of the spacer are respectively and slidably inserted into the engaging grooves of the sliding blocks along the longitudinal direction, thereby sustaining sliding of each sliding block only along the longitudinal direction with respect to another sliding block,
wherein the track surfaces of each sliding block are respectively arranged at two opposite sides of the receiving portion of the spacer, each roller is respectively arranged in the rolling grooves of the sliding blocks, and the rollers are rollably clamped between the track surfaces of the sliding blocks by respectively inserting the engaging portions into the engaging grooves.
2. The linear guideway as claimed in claim 1, wherein the distance between the two sliding blocks is equal to or smaller than the thickness of the receiving portion of the spacer.
3. The linear guideway as claimed in claim 2, wherein a portion of the spacer without any thru-hole has a H-shaped cross-section perpendicular to the longitudinal direction.

4. The linear guideway as claimed in claim 2, wherein each engaging portion has at least two sheets, any two adjacent sheets of each engaging portion are extended from the longitudinal edge of the receiving portion in two different directions, wherein the engaging groove of each sliding block has at least two sub-grooves, the sheets of the engaging portions are respectively inserted into the sub-grooves of the engaging grooves, and any two adjacent sheets of each engaging portion are respectively inserted into the sub-grooves of the engaging groove.

5. The linear guideway as claimed in claim 1, wherein the spacer has a Y-shaped cross-section perpendicular to the longitudinal direction.

6. The linear guideway as claimed in claim 1, wherein each roller is movable with respect to the respective thru-hole of the spacer, and the spacer and the sliding blocks are straight or curvy.

7. A track module, comprising:
- an elongated spacer defining a longitudinal direction, wherein the spacer has a receiving portion and two engaging portions, the receiving portion has a plurality of thru-holes arranged in a row along the longitudinal direction and spaced apart from each other, the engaging portions are respectively arranged on two opposite edges of the receiving portion,
- wherein the spacer is integrally formed in one piece, the engaging portions are respectively extended from two opposite longitudinal edges of the receiving portion, wherein the receiving portion resembles a sheet and defines a normal direction perpendicular to a main surface of the receiving portion, the receiving portion has a thickness along the normal direction, each engaging portion has a height along the normal direction, and the height of each engaging portion is greater than the thickness of the receiving portion; and
- two sliding blocks, wherein each sliding block has a rolling groove and an engaging groove concavely formed on a bottom portion of the rolling groove, each rolling groove has two track surfaces spaced apart from each other, and each engaging groove is in air communication with the corresponding rolling groove,
- wherein the engaging portions of the spacer are respectively and slidably inserted into the engaging grooves of the sliding blocks along the longitudinal direction, thereby sustaining sliding of each sliding block only along the longitudinal direction with respect to another sliding block; wherein the track surfaces of each sliding block are respectively arranged at two opposite sides of the receiving portion of the spacer.

8. A linear guideway, comprising:
- an elongated spacer defining a longitudinal direction, wherein the spacer has a receiving portion and two engaging portions, the receiving portion has a plurality of thru-holes arranged in a row along the longitudinal direction and spaced apart from each other, the engaging portions are respectively arranged on two opposite edges of the receiving portion,
- wherein the spacer has a Y-shaped cross-section perpendicular to the longitudinal direction;
- a plurality of rollers respectively arranged in the thru-holes of the spacer; and
- two elongated sliding blocks, wherein each sliding block has a rolling groove and an engaging groove concavely formed on a bottom portion of the rolling groove, each rolling groove has two track surfaces spaced apart from each other, and each engaging groove is in air communication with the corresponding rolling groove,
- wherein the engaging portions of the spacer are respectively and slidably inserted into the engaging grooves of the sliding blocks along the longitudinal direction, thereby sustaining sliding of each sliding block only along the longitudinal direction with respect to another sliding block,
- wherein the track surfaces of each sliding block are respectively arranged at two opposite sides of the receiving portion of the spacer, each roller is respectively arranged in the rolling grooves of the sliding blocks, and the rollers are rollably clamped between the track surfaces of the sliding blocks by respectively inserting the engaging portions into the engaging grooves.

* * * * *